US010629183B2

(12) United States Patent
Torres et al.

(10) Patent No.: US 10,629,183 B2
(45) Date of Patent: Apr. 21, 2020

(54) SYSTEMS AND METHODS FOR NOISE-CANCELLATION USING MICROPHONE PROJECTION

(71) Applicant: Bose Corporation, Framingham, MA (US)

(72) Inventors: Wade Torres, Attleboro, MA (US); Eric Bernstein, Cambridge, MA (US); Ankita Jain, Westborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/120,171

(22) Filed: Aug. 31, 2018

(65) Prior Publication Data

US 2020/0074976 A1 Mar. 5, 2020

(51) Int. Cl.
*H04B 15/00* (2006.01)
*G10K 11/178* (2006.01)

(52) U.S. Cl.
CPC .. *G10K 11/17853* (2018.01); *G10K 11/17823* (2018.01); *G10K 11/17825* (2018.01);
(Continued)

(58) Field of Classification Search
CPC ....... G10K 11/17853; G10K 11/17823; G10K 11/17825; G10K 11/17881
See application file for complete search history.

(56) References Cited

U.S. PATENT DOCUMENTS

| | | | |
|---|---|---|---|
| 5,381,485 | A | 1/1995 | Elliott |
| 5,418,873 | A | 5/1995 | Erikson |

(Continued)

FOREIGN PATENT DOCUMENTS

| | | |
|---|---|---|
| CN | 104952442 | 9/2015 |
| EP | 1414021 | 5/2008 |

(Continued)

OTHER PUBLICATIONS

Roure et al., The Remote Microphone Technique for Active Noise Control, Proceedings of Active 99, Dec. 1999, ISSN 0-9622072-2-5, pp. 1233-1244.

(Continued)

*Primary Examiner* — Simon King
(74) *Attorney, Agent, or Firm* — Bond, Schoeneck & King, PLLC

(57) ABSTRACT

A noise-cancellation system includes a noise-cancellation filter configured to generate a noise-cancellation signal based on a noise signal received from a noise sensor; an actuator disposed at a first location within a predefined volume and configured to receive the noise-cancellation signal and to transduce a noise-cancellation audio signal within the predefined volume; a reference sensor disposed at a second location within the predefined volume and to output a reference sensor signal, the reference sensor signal being representative of an undesired noise at the second location; a filter configured to filter the noise-cancellation signal and the reference sensor signal to output a filter output signal, the filter output signal representing an estimate of the undesired nose at a third location remote from the first location and the second location; and an adjustment module configured to adjust the noise-cancellation filter, based on the filter output signal, such that the noise-cancellation audio signal destructively interferes with the undesired noise at the third location.

20 Claims, 6 Drawing Sheets

(52) U.S. Cl.
CPC .................. *G10K 11/17881* (2018.01); *G10K 2210/1282* (2013.01); *G10K 2210/3011* (2013.01); *G10K 2210/3026* (2013.01); *G10K 2210/3027* (2013.01); *G10K 2210/3028* (2013.01)

(56) References Cited

U.S. PATENT DOCUMENTS

| | | | |
|---|---|---|---|
| 7,340,064 | B2 | 3/2008 | Onishi et al. |
| 7,885,417 | B2 | 2/2011 | Christoph |
| 8,077,873 | B2 | 12/2011 | Shridhar et al. |
| 8,135,140 | B2 | 3/2012 | Shridhar et al. |
| 8,189,799 | B2 | 5/2012 | Shridhar et al. |
| 8,199,923 | B2 | 6/2012 | Christoph |
| 8,199,924 | B2 | 6/2012 | Wertz et al. |
| 8,270,626 | B2 | 9/2012 | Shridhar et al. |
| 8,315,404 | B2 | 11/2012 | Shridhar et al. |
| 8,559,648 | B2 | 10/2013 | Christoph |
| 8,565,443 | B2 | 10/2013 | Wurm |
| 8,644,521 | B2 | 2/2014 | Christoph et al. |
| 8,718,289 | B2 | 5/2014 | Shridhar et al. |
| 8,848,937 | B2 | 9/2014 | Inoue et al. |
| 9,020,158 | B2 | 4/2015 | Wertz et al. |
| 9,042,569 | B2 | 5/2015 | Sakamoto et al. |
| 9,153,226 | B2 | 10/2015 | Wurm |
| 9,431,001 | B2 | 8/2016 | Cherkassky et al. |
| 9,445,192 | B2 | 9/2016 | Ueno et al. |
| 9,478,209 | B2 | 10/2016 | Wurm |
| 9,596,540 | B2 | 3/2017 | Tani et al. |
| 9,646,596 | B2 | 5/2017 | Tani et al. |
| 9,870,763 | B1 | 1/2018 | Christian |
| 2016/0314778 | A1 | 10/2016 | Christoph et al. |
| 2017/0032806 | A1* | 2/2017 | Konjeti .................. G10L 15/20 |
| 2017/0076711 | A1 | 3/2017 | Christoph et al. |
| 2017/0076712 | A1 | 3/2017 | Christoph |
| 2017/0077906 | A1* | 3/2017 | Argyropoulos .... H03H 21/0012 |
| 2017/0110108 | A1 | 4/2017 | Christoph et al. |
| 2017/0178617 | A1 | 6/2017 | Christoph et al. |
| 2017/0330551 | A1 | 11/2017 | Zafeiropoulos |
| 2019/0104360 | A1* | 4/2019 | Bou Daher ............ H04R 3/005 |

FOREIGN PATENT DOCUMENTS

| | | |
|---|---|---|
| EP | 2375408 | 10/2011 |
| EP | 3147896 | 3/2017 |
| EP | 3156998 | 4/2017 |
| EP | 3157000 | 4/2017 |
| EP | 3157001 | 4/2017 |
| EP | 3159891 | 8/2018 |
| GB | 2270441 | 3/1994 |
| KR | 20160118156 | 10/2016 |

OTHER PUBLICATIONS

Moreau et al., A Review of Virtual Sensing Algorithms for Active Noise Control, Algorithms, 2008, 1, 69-99; DOI: 10.3390/a1020069, ISSN 1999-4893, pp. 69-99.

Oh et. al., Development of Mass Producible ANC System for Broad-Band Road Noise, SAE Technical Paper 2018-01-1561, Jun. 13, 2018, doi:10.4271/2018-01-1561, pp. 1-5.

Garcia-Bonito J. et al: "Generation of Zones of Quiet Using a Virtual Microphone Arrangement", The Journal of the Acoustical Society of America, American Institute of Physics for the Acoustical Society of America, New York, NY, US, vol. 101, No. 6, Jun. 1, 1997 (Jun. 1, 1997), pp. 3498-3516, XP000696885, ISSN: 0001-4966, DOI: 10.1121/1.418357.

B. Rafaely et al: "Broadband performance of an active headrest", The Journal of the Acoustical Sociery of America, vol. 16, No. 2, Aug. 1, 1999 (Aug. 1, 1999), pp. 787-793, XP055526495, New York, NY, US, ISSN: 001-4966, DOI: 10.1121/1.427134.

International Search Report and The Written Opinion of The International Searching Authority, International Application No. PCT/US2019/048859, pp. 1-14, dated Jan. 3, 2020.

* cited by examiner

SYSTEMS AND METHODS FOR NOISE-CANCELLATION USING MICROPHONE PROJECTION

BACKGROUND

The present disclosure generally relates to systems and methods and of minimizing an error signal representative of undesired noise at a location remote from a reference sensor.

SUMMARY

All examples and features mentioned below can be combined in any technically possible way.

In an aspect, a noise-cancellation system includes a noise-cancellation filter configured to generate a noise-cancellation signal based on a noise signal received from a noise sensor; an actuator disposed at a first location within a predefined volume and configured to receive the noise-cancellation signal and to transduce a noise-cancellation audio signal within the predefined volume; a reference sensor disposed at a second location within the predefined volume and to output a reference sensor signal, the reference sensor signal being representative of an undesired noise at the second location; a filter configured to filter the noise-cancellation signal and the reference sensor signal to output a filter output signal, the filter output signal representing an estimate of the undesired nose at a third location remote from the first location and the second location; and an adjustment module configured to adjust the noise-cancellation filter, based on the filter output signal, such that the noise-cancellation audio signal destructively interferes with the undesired noise at the third location.

In an embodiment, the filter output signal is based on an estimate of a relationship between the first location and the third location and based on an estimate of a relationship between the second location and the third location.

In an embodiment, the filter comprises a first filter configured to estimate a relationship between the second location and the third location, the first filter being configured to receive and filter the reference sensor signal and to output a first filter output signal, the first filter output signal being an estimate of the undesired noise at the third location.

In an embodiment, the filter further comprises a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

In an embodiment, the filter comprises at least one predictive filter such that the estimate the undesired noise at the third location is an estimate of the undesired noise at the third location at a future point in time.

In an embodiment, the at least one predictive filter is a Wiener filter.

In another aspect, program code stored on a non-transitory storage medium that, when executed by a processor, includes the steps of: generating, with a noise-cancellation filter, a noise-cancellation signal based on a noise signal received from a noise sensor; providing the noise-cancellation signal to an actuator disposed at a first location for transduction of a noise-cancellation audio signal within the predefined volume; receiving a reference sensor signal from a reference sensor disposed at a second location within the predefined volume, the reference sensor signal being representative of an undesired noise at the second location; filtering, with a filter, the noise-cancellation signal and the reference sensor signal to output a filter output signal, the filter output signal representing an estimate of the undesired noise at a third location remote from the first location and the second location; and adjusting the noise-cancellation filter, based on the filter output, such that the noise-cancellation audio signal destructively interferes with the undesired noise at the third location.

In an embodiment, the filter output signal is based on an estimate of a relationship between the first location and the third location and based on an estimate of a relationship between the second location and the third location.

In an embodiment, the filter includes a first filter configured to estimate a relationship between the second location and the third location, the first filter being configured to receive and filter the reference sensor signal and to output a first filter output signal, the first filter output signal being an estimate of the undesired noise at the third location.

In an embodiment, the filter further includes a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

In an embodiment, the filter includes at least one predictive filter such that the estimate the undesired noise at the third location is an estimate of the undesired noise at the third location at a future point in time.

In an embodiment, the at least one predictive filter is a Wiener filter.

A noise-cancellation method, comprising the steps of: generating, with a noise-cancellation filter, a noise-cancellation signal based on a noise signal received from a noise sensor; providing the noise-cancellation signal to an actuator disposed at a first location for transduction of a noise-cancellation audio signal within the predefined volume; receiving a reference sensor signal from a reference sensor disposed at a second location within the predefined volume, the reference sensor signal being representative of an undesired noise at the second location; filtering, with a filter, the noise-cancellation signal and the reference sensor signal to output a filter output signal, the filter output signal representing an estimate of the undesired noise at a third location remote from the first location and the second location; and adjusting the noise-cancellation filter, based on the filter output, such that the noise-cancellation audio signal destructively interferes with the undesired noise at the third location.

In an embodiment, the filter output signal is based on an estimate of a relationship between the first location and the third location and based on an estimate of a relationship between the second location and the third location.

In an embodiment, the filter comprises a first filter configured to estimate a relationship between the second location and the third location, the first filter being configured to receive and filter the reference sensor signal and to output a first filter output signal, the first filter output signal being an estimate of the undesired noise at the third location.

In an embodiment, the filter further comprises a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

In an embodiment, the filter includes at least one predictive filter such that the estimate the undesired noise at the third location is an estimate of the undesired noise at the third location at a future point in time.

In an embodiment the at least one predictive filter may be a Wiener filter.

In various examples, the method may further include the step of: during a configuration, using an error signal from an error sensor positioned at the third location to tune the filter.

In an embodiment, the error signal is generated in response to an audio signal generated at the actuator.

'The details of one or more implementations are set forth in the accompanying drawings and the description below. Other features, objects, and advantages will be apparent from the description and the drawings, and from the claims.

DETAILED DESCRIPTION

Noise-cancellation systems that cancel noise in a predefined volume, such as a vehicle cabin, often employ a reference sensor to generate an error signal representative of residual uncancelled noise. This error signal is fed back to an adaptive filter that adjusts the noise-cancellation signal such that the residual uncancelled noise is minimized.

However, in some contexts, it is desired to cancel noise at a location remote from the reference sensor. For example, in the vehicle context, the reference sensor may be placed in the roof, pillar, or headrest, but the noise should be canceled at the passenger's ears. As a result, the error signal is indicative of the error at the reference sensor, but not at the passenger's ears. This, however, is undesirable because the objective of a road-noise-cancellation system is to cancel noise at the passenger's ears. Further, placing microphones on passenger's ears is impractical—even though the ear mic signal is typically required for the adaptive algorithm to function optimally.

In addition, noise-cancelling audio signals—in the vehicle and other contexts—are typically delayed approximately five milliseconds, as the sound must travel from a speaker disposed along the perimeter of the vehicle cabin to the passenger's ears (e.g., the noise-cancelling audio signal must travel from five feet away from the passenger's ear and the speed of sound is approximately one foot per millisecond). This delay prevents optimal cancelling because the noise-cancelling audio signal, as perceived by the passenger, is no longer current, but is rather directed toward noise that has already occurred. Accordingly, there is a need in the art to predict future values of the residual noise at the passenger's ears without placing a microphone at the user's ears.

Various embodiments disclosed herein are directed to a noise-cancellation system that estimates or predicts an error signal representative of residual uncancelled noise at a location remote from the reference sensor. The estimation or prediction, in an embodiment, is based on available information from, namely, remote reference microphones, and from knowledge of the relationship between those remote microphones and the noise field at the passenger's ears and of the output of the noise cancellation system itself. Predicting a future value of the noise is possible because future samples are correlated with current samples, and so knowledge of the current state has information about the future state.

The resulting adjustment to the adaptive filter, based on the estimated or predicted error signal, will minimize the estimated or predicted error signal and thus cancel the undesired noise at remote location rather than at the reference sensor, effectively projecting the reference sensor at the remote location. This may alternately be understood as shifting the cancellation zone from the reference sensor to the location remote from the reference sensor.

Figure 1:
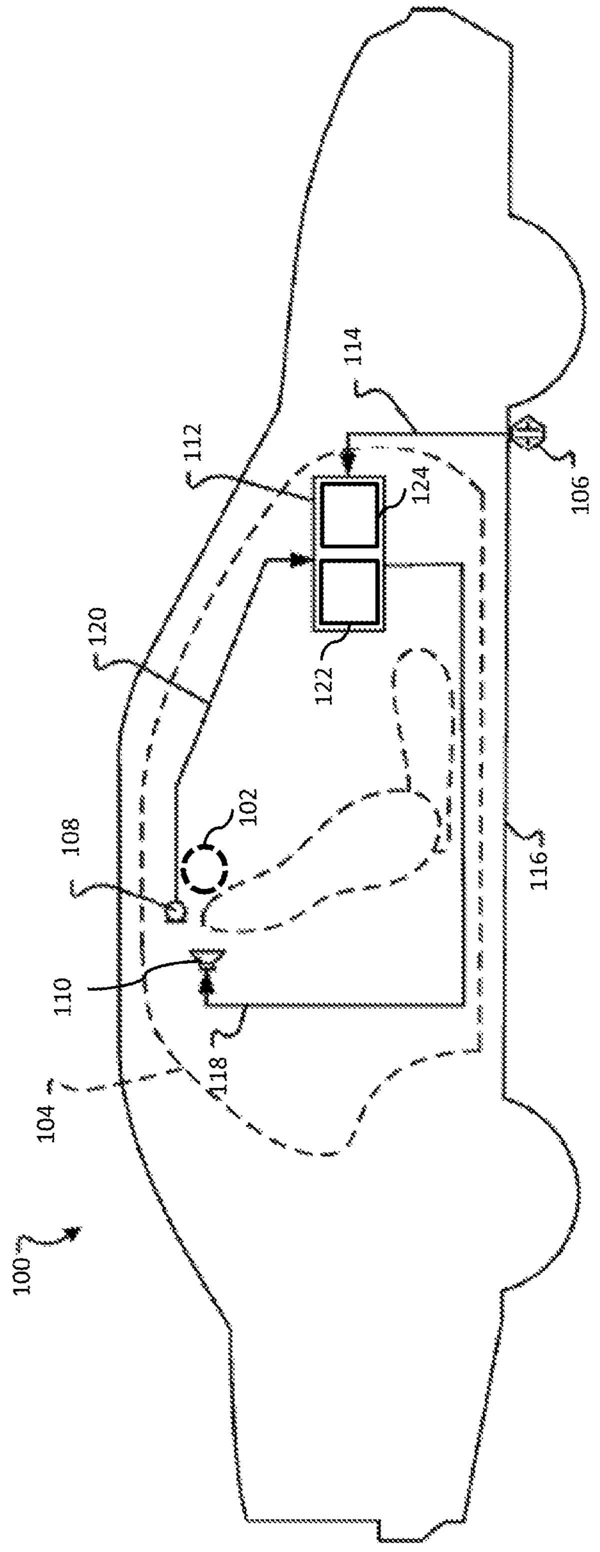
FIG. 1 is a schematic of a noise-cancellation system according to an embodiment.

FIG. 1 is a schematic view of noise-cancellation system 100 that estimates or predicts and minimizes an error signal at a location remote from a reference sensor. Specifically, noise-cancellation system 100 is configured to destructively interfere with undesired sound in at least one cancellation zone 102 within a predefined volume 104 such as a vehicle cabin. At a high level, an embodiment of noise-cancellation system 100 may include a noise sensor 106, a reference sensor 108, an actuator 110, and a controller 112.

In an embodiment, noise sensor 106 is configured to generate noise signal(s) 114 representative of the undesired sound, or a source of the undesired sound, within predefined volume 104. For example, as shown in FIG. 1, noise sensor 106 may be an accelerometer mounted to and configured to detect vibrations transmitted through a vehicle structure 116. Vibrations transmitted through the vehicle structure 116 are transduced by the structure into undesired sound in the vehicle cabin (perceived as a road noise), thus an accelerometer mounted to the structure provides a signal representative of the undesired sound.

Actuator 110 may, for example, be speakers distributed in discrete locations about the perimeter of the predefined volume 104. In an example, four or more speakers may be disposed within a vehicle cabin, each of the four speakers being located within a respective door of the vehicle and configured project sound into the vehicle cabin. In alternate embodiments, speakers may be located within a headrest, or elsewhere in the vehicle cabin.

A noise-cancellation signal 118 may be generated by controller 112 and provided to one or more speakers in the predefined volume, which transduce the noise-cancellation signal 118 to acoustic energy (i.e., sound waves). The acoustic energy produced as a result of noise-cancellation signal 118 is approximately 180° out of phase with—and thus destructively interferes with—the undesired sound within the cancellation zone 102. The combination of sound waves generated from the noise-cancellation signal 118 and the undesired noise in the predefined volume results in cancellation of the undesired noise, as perceived by a listener in a cancellation zone.

Because noise-cancellation cannot be equal throughout the entire predefined volume, noise-cancellation system 100 is configured to create the greatest noise cancellation within one or more predefine cancellation zones 102 with the predefined volume. The noise-cancellation within the cancellation zones may effect a reduction in undesired sound by approximately 3 dB or more (although in varying embodiments, different amounts of noise-cancellation may occur). Furthermore, the noise-cancellation may cancel sounds in a range of frequencies, such as frequencies less than approximately 350 Hz (although other ranges are possible).

Reference sensor 108, disposed within the predefined volume, generates a reference sensor signal 120 based on detection of residual noise resulting from the combination of the sound waves generated from the noise-cancellation signal 118 and the undesired sound in the predefined volume. The reference sensor signal 120 is provided to controller 112 as feedback. Because reference sensor signal 120 will represent residual noise, uncancelled by the noise-cancellation signal, reference sensor signal 120 may be understood as an error signal. Reference sensors 108 may be, for example, at least one microphone mounted within a vehicle cabin (e.g., in the roof, headrests, pillars, or elsewhere within the cabin).

In an embodiment, controller 112 may comprise a non-transitory storage medium 122 and processor 124. In an embodiment, non-transitory storage medium 122 may store program code that, when executed by processor 124, implements the various filters and algorithms described in connection with FIGS. 2-6. Controller 112 may be implemented in hardware and/or software. For example, controller may be implemented by an FPGA, an ASIC, or other suitable hardware.

Figure 2:
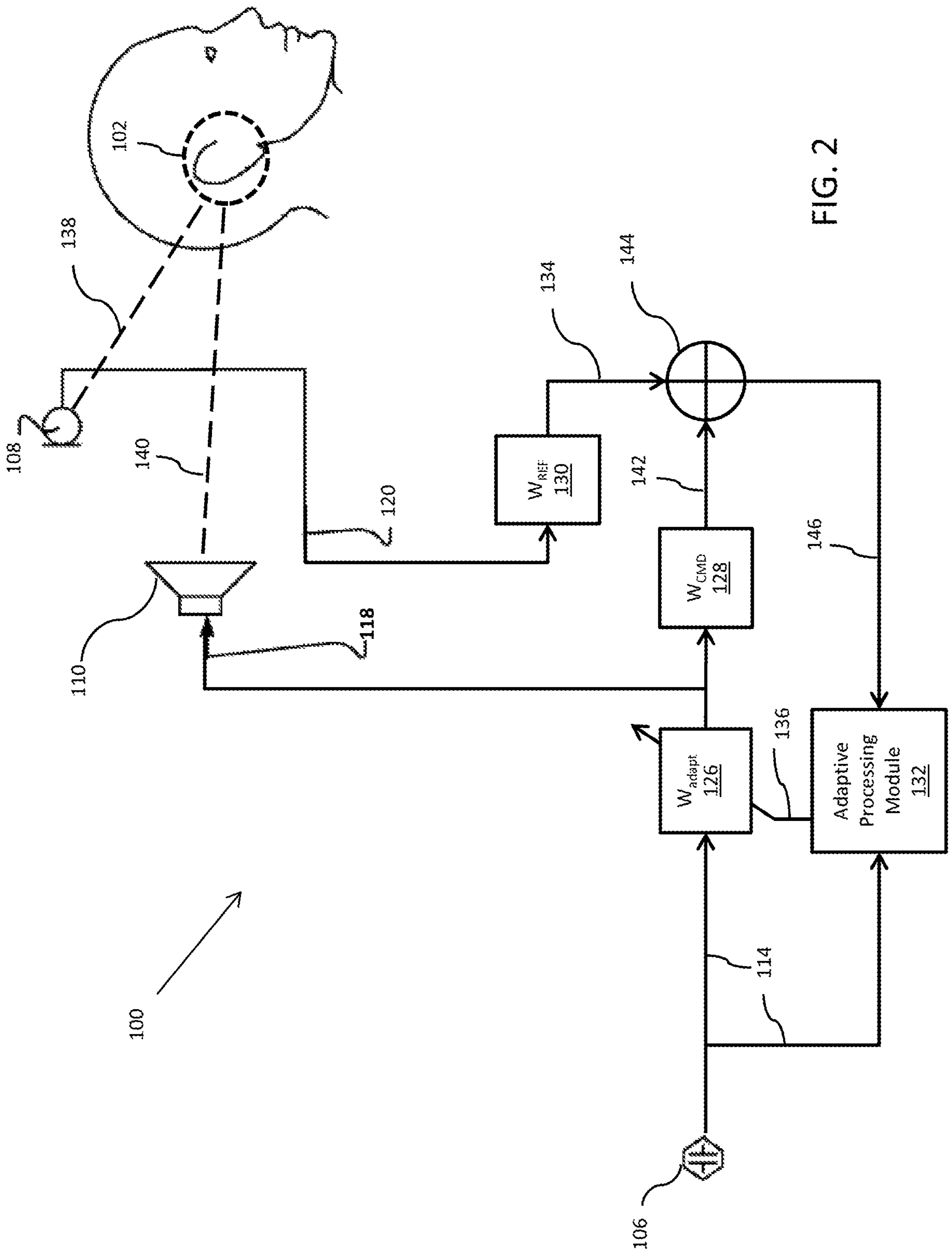
FIG. 2 is a schematic of a noise-cancellation system according to an embodiment.

Turning to FIG. 2, there is shown a block diagram of an embodiment of noise-cancellation system 100, including a plurality of filters implemented by controller 112. As shown, controller may define a control system including Wadapt filter 126, Wcmd filter 128, Wref filter 130, and an adaptive processing module 132.

Wadapt filter 126 is configured to receive the noise signal 114 of noise sensor 106 and to generate noise-cancellation signal 118. Noise-cancellation signal 118, as described above, is input to actuator 110 where it is transduced into the noise-cancellation audio signal that destructively interferes with the undesired sound in the predefined cancellation zone 102. Wadapt filter 126 may be implemented as any suitable linear filter, such as a multi-input multi-output (MIMO) finite impulse response (FIR) filter.

Adaptive processing module 132 receives as inputs the reference sensor signal 134 (filtered by Wref filter 130 and summed with the output of Wcmd filter 128, as will be described below) and the noise signal 114 and, using those inputs, generates a filter update signal 136. The filter update signal 136 is an update to the filter coefficients implemented in Wadapt filter 126. The noise-cancellation signal 118 produced by the updated Wadapt filter 126 will minimize error signal 146.

However, the reference sensor 108, as described above, may be positioned remote from the cancellation zone. Accordingly, the error signal output by the reference sensors may not be directly indicative of the residual noise in the cancellation zone 102, but may instead be indicative of the residual noise at the reference sensor 108.

In order to estimate or predict, therefore, the residual noise in the cancellation zone (i.e., estimate or predict the output of a sensor placed in the cancellation zone 102), two signals at the ear must be estimated or predicted correctly: one signal due to the undesired noise (e.g., road noise) and the other due to the cancellation signal played from the loud speakers. Such estimation or prediction requires, in an embodiment at least one filter (such as a Wiener filter) that receives as inputs the reference sensor signal 120 and noise-cancellation signal 118 then outputs an optimal estimate or prediction of what a sensor would output were it placed at the cancellation zone 102 (it will be understood that, as used herein, an estimate may be a prediction, that is, an estimate of a value at a future point in time).

In an embodiment, the filter may be implemented as Wcmd filter 128 and Wref filter 130 shown in FIG. 2. As shown, Wcmd filter 128 and Wref filter 130 may be predictive filters configured to filter the reference sensor signal 120 and the noise-cancellation signal 112 to generate an estimate or prediction of a signal representative of the residual noise present within the cancellation zone. Wcmd filter 128 and Wref filter 130 may, in an embodiment, be each implemented as Wiener filters. In one example, the Wiener filters are implemented as finite impulse response (FIR) filters (i.e., finite impulse response Wiener filters). However, one or both of the Wiener filters may alternatively be implemented as an infinite impulse response (IIR) filter. Furthermore, while Wiener filters are described, other suitable filters or predictive filters may be utilized, such as L1 optimal filters, H_infinity optimal filters, etc.

Wref filter 130 is configured to estimate or predict the relationship (e.g., the transfer function) between the location of the reference sensor 108 and the cancellation zone 102. The relationship between the reference sensor 108 and the cancellation zone 102 will be determined by the physical path 138 between the locations of each. Further, the relationship will likely be dominated by the acoustic modes of the predefined volume (e.g., the vehicle cabin) and will not vary greatly with time.

Wref filter 130 is thus configured to compute a statistical estimate of the residual noise at the passenger's ears using the reference sensor signal 120 as an input and filter that signal to produce the estimate or prediction as an output (i.e., Wref output signal 134). Wref filter 130 may therefore be characterized by the following equation:

$$W_{ref}[n]=T_{re}[n] \quad (1)$$

where $T_{re}$ [n] is the transfer function between reference sensor 108 and the cancellation zone 102 at time n. The Wref output signal 134 will thus represent an estimate or prediction of the noise at the passenger's ear, based on the input reference sensor signal 120 and the estimated/predicted relationship between the location of the reference sensor 108 and the cancellation zone 102.

Ideally, the output of Wref filter 130 is the statistical estimate or prediction of only the residual noise at the passenger's ears, as described above; however, in practice, reference sensors 108 likely also receive the noise-cancellation audio signal as output by actuator 110, as they are positioned within the same predefined volume 104.

Wcmd filter 128 is configured to estimate or predict the relationship (e.g., the transfer function) between the location of the actuator 110 (i.e., the origin of the noise-cancellation audio signal) and the cancellation zone 102, which will be determined by the physical path 140 between the locations of each. Like the relationship between the reference sensor 108 and the cancellation zone 102, the relationship between the actuator 110 and the cancellation zone 102 will likely be dominated by the acoustic modes of the predefined volume (e.g., the vehicle cabin) and will not vary greatly with time.

As mentioned above, in addition to undesired sound, the reference sensor 108 will likely pick up the noise-cancellation audio signal output from the actuator 110. The Wcmd filter 128 may be configured to correct for this, such that the correct estimate or prediction is obtained in the presence of both the cancellation signal along with the undesired noise.

Wcmd filter 128 is thus configured to compute a statistical estimate of the noise-cancellation audio signal 118 at the cancellation zone and configured to remove the noise-cancellation signal audio signal picked up by reference sensor 108. In an embodiment, Wcmd filter 128 may thus be characterized by the following equation:

$$W_{cmd}[n]=T_{de}[n]-W_{ref}[n]*T_{dr}[n] \quad (2)$$

where $T_{de}$ [n] is the transfer function from the speakers to the cancellation zone 102 at time n and $T_{dr}$ [n] is the transfer function from the actuator 110 to the reference sensor 108 at time n. The Wmcd output signal 142 will thus represent estimate or prediction of the noise-cancellation audio signal 118 at the cancellation zone and will be configured to cancel the noise-cancellation signal audio signal picked up by reference sensor 108.

When the output of Wref filter 130 and Wcmd filter 128 are added together, as described below, the result is an estimate (possibly at a future time, e.g., predictive) of the noise at the passenger's ears that is due to both the road induced noise and the cancellation signal.

In summary, Wref and Wcmd are designed to estimate or predict the sound at the occupant's ears using as inputs the reference microphones and the noise-cancellation signals. Wiener filters that optimize the mean-square error can be used, as can other filter design techniques that optimize other criterion (weighted mean-square error, L1-norm, H-infinity norm, etc.).

The Wref filter 130 and Wcmd filter 128 may be defined in accordance with the equations described below.

The basic formulation of any optimal estimation problem is to minimize some measure of the difference between the actual signal and the estimate, i.e., $$J[n]=\|m[n+k]-\hat{m}[n]\| \quad (3)$$

where m[n] is a vector of reference sensor signals 120 (in an embodiment this may comprise multiple reference sensor signals 120 from multiple reference sensors 108 or a single signal from a single reference sensor 108) at time n, a "^" over a variable denotes that it is an estimate, ||•|| represents a norm, and k is a non-negative integer that represents the prediction part of the filter (i.e., our current estimate is an estimate of the ear mics k samples in the future.) Many norms can be used, such as an $\mathcal{H}_\infty$-norm, $\mathcal{L}_1$-norm, etc. In an embodiment, an $\mathcal{L}_2$-norm, which can be considered a type of Wiener filter, is used. Specifically, the following may be used:

$$J[n]=\|m[n+k]-\hat{m}[n]\|_2 \quad (4)$$

Now that the cost function has been defined, the specific problem may be cast in the form of a Wiener filter design so that the filters that are used in FIG. 2, in an embodiment, may be computed. The first step is to express the estimate of the residual undesired noise at the noise-cancellation zone 102 in terms of the variables are available, namely, the reference sensor signal 120 (located, e.g., on the roof of the vehicle) and the noise cancellation audio signal generated by actuator 110. Of course there are may be other noises predefined volume 104 or the cancellation zone 102, but only signals related to the undesired noise (e.g., road noise) and the noise-cancellation signal 112 need to be considered, as other uncorrelated noises do not affect the noise-cancellation system 100. So, as defined, the estimate is going to be obtained by linearly filtering the reference sensor signal 120, m[n], and noise-cancellation signal 112, u[n]:

$$\hat{m}[n]=W_{ref}[n]*m[n]+W_{cmd}[n]*u[n] \quad (5)$$

or, to use a more "matrix"-type notation:

$$\hat{m}[n] = [W_{ref}[n]W_{cmd}[n]]*\begin{bmatrix} m[n] \\ u[n] \end{bmatrix} \quad (6)$$

$$= W_{total}[n]*\begin{bmatrix} m[n] \\ u[n] \end{bmatrix} \quad (7)$$

Now the problem can be stated as: Find the filters $W_{ref}$ [n] and $W_{cmd}$ [n], such that they minimize the cost function given by:

$$J[n] = \|m[n+k]-(W_{ref}[n]*m[n]+W_{cmd}[n]*u[n])\|_2 \quad (8)$$

$$= \left\| m[n+k]-W_{total}[n]*\begin{bmatrix} m[n] \\ u[n] \end{bmatrix} \right\|_2 \quad (9)$$

This is now formulated as a Wiener filter design, and standard solution techniques may be used. In practice, data may be collected in order to generate filters $W_{ref}$ [n] and $W_{cmd}$ [n], as will described in connection with FIGS. 5-6 below.

Returning to FIG. 2, as shown, the Wref output signal 134 and the Wcmd 142 output signal may be summed at summing block 144. The output 146 of the two filtered signals represents an estimate or prediction of the residual uncancelled sound at the cancellation zone 102, which is remote from the reference sensor 108. The output 146 of the summing block 144 is input to adaptive processing module 132. The filter update signal 136 may then be fed to Wadapt filter 126, which generates a noise-cancellation signal 118 based on an estimate or prediction of the undesired sound in the cancellation zone 102 rather than at the location of reference sensor 108, minimizing the estimated or predicted error signal rather than the reference signal. In this vehicle context, this results in further minimization of the residual noise at the passenger's ears.

Noise-cancellation system 100 may be a single-input/single-output control system or a multi-input/multi-output control system. Noise-cancellation system 100 may include any number of noise sensors 106, reference sensors 108, speakers 110, and cancellation zones 102. For example, noise-cancellation system may be extended to include a predictive filter to estimate or predict the relationship between each reference sensor 108 and each cancellation zone 102. Similarly, noise-cancellation system 100 may be extended to include a predictive filter to estimate or predict the relationship between each reference sensor 108 and each cancellation zone 102.

Furthermore, it should be understood that the noise-cancellation system 100 depicted in FIG. 2 is merely provided as an embodiment of a control system. Indeed, the control system may be any suitable adaptive control system (feedforward or feedback) that can minimize the estimated or predicted undesired noise at the cancellation zone created by Wcmd filter 128 and Wref filter 130.

Figure 3:
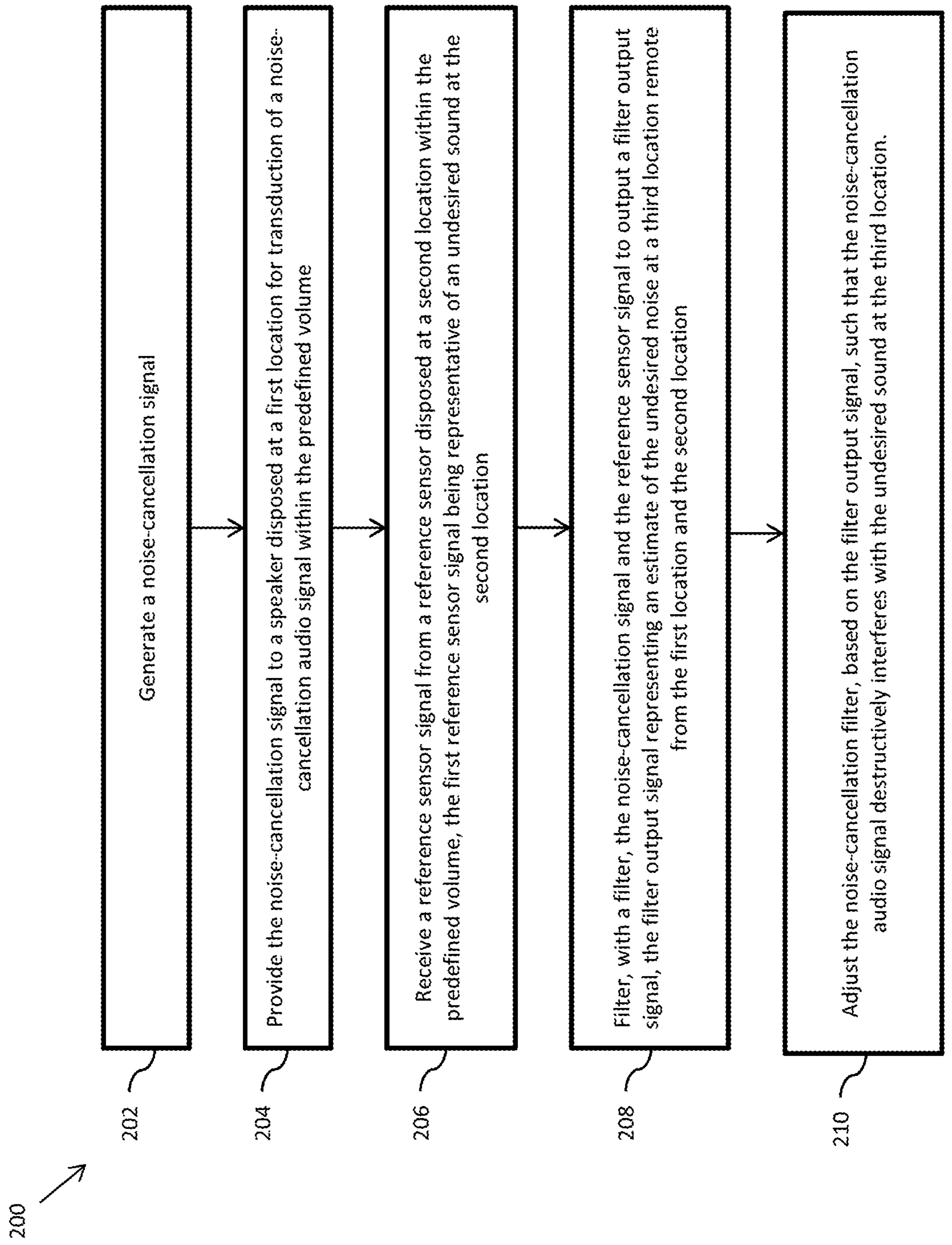
FIG. 3 is a flowchart of a noise-cancellation method according to an embodiment.

FIG. 3 depicts a flowchart of a noise-cancellation method 200 for estimating and cancelling the undesired noise in a cancellation zone that is at a location remote from a reference sensor. Method 200 may be implemented by a control system, such as noise-cancellation system 100 described in connection with FIGS. 1-2.

At step 202 a noise-cancellation signal is generated. The noise-cancellation signal may be generated using an adaptive filter such as Wadapt filter 126, however it should be understood that any suitable adaptive filter (feedforward or feedback) that can minimize the undesired noise at the cancellation zone, as estimated or predicted by Wcmd filter 128 and Wref filter 130, may be used.

At step 204, the noise-cancellation signal is provided to an actuator 108, such as a speaker, disposed at a first location for transduction of a noise-cancellation audio signal within the predefined volume. As described above, the noise-cancellation audio signal may, for example, be approximately 180° out of phase with—and thus destructively interferes with—the undesired sound within a cancellation zone disposed at a third location corresponding to the expected position of a passenger's ears. The combination of sound waves generated from the noise-cancellation signal and the undesired noise in the predefined volume results in cancellation of the undesired noise, as perceived by a listener in the cancellation zone. The noise-cancellation within the cancellation zones may effect a reduction in undesired sound by approximately 3 dB or more (although in varying embodiments, different amounts of noise-cancellation may occur). Furthermore, the noise-cancellation may cancel sounds in a range of frequencies, such as frequencies less than approximately 350 Hz (although other ranges are possible).

At step 206, a reference sensor signal is received from a reference sensor disposed at a second location within the predefined volume, the first reference sensor signal being representative of an undesired sound at the second location. Because the reference sensor signal will represent residual noise, uncancelled by the noise-cancellation signal, reference signal may be understood as an error signal provided as feedback to the adaptive filter. Further, the reference sensor may be positioned at the second location remote from the cancellation zone. For example, the reference sensor, as described above, may be located in headrest, pillar, or roof of a vehicle cabin, but the cancellation zone may be located at the ear(s) of a passenger in the vehicle. Accordingly, the error signal output by the reference sensors may not be directly indicative of the quality of noise cancellation at the cancellation zone, but rather at the location of the reference sensor.

At step 208, with a filter, the noise-cancellation signal and the reference sensor signal are filtered to output a filter output signal, the filter output signal representing an estimate or prediction of the undesired noise at a third location remote from the first location and the second location. The filter output signal is based on an estimate or prediction of a relationship between the first location and the third location and based on an estimate or prediction of a relationship between the second location and the third location.

For example, the filter may comprise a first filter configured to estimate or predict a relationship between the second location and the third location, the first filter being configured to receive and filter the reference sensor signal and to output a first filter output signal—the first filter output signal being an estimate or prediction of the undesired noise at the third location. For example, the first filter may be configured to estimate or predict the relationship (e.g., the transfer function) between the location of the reference sensor and the cancellation zone. The relationship between the reference sensor and the cancellation zone will be determined by the physical path between the locations of each. The first filter is thus configured to receive the reference sensor signal and to output a filtered output signal that represents an estimate or prediction of the residual noise at the cancellation zone.

The filter may also comprise a second filter configured to estimate or predict a relationship between the first location and the third location, the second filter being configured to receive and filter the noise-cancellation signal and to output a second filter output signal—the second filter output signal being an estimate or prediction of the noise-cancellation audio signal at the third location. For example, the second filter is configured to predict the relationship (e.g., the transfer function) between the location of the actuator (i.e., the origin of the noise-cancellation audio signal) and the cancellation zone. The relationship between actuator and the cancellation zone will be determined by the physical path between the locations of each. The second filter is thus configured to receive the noise-cancellation signal and to output a filtered output signal that represents an estimate or prediction of the noise-cancellation audio signal at the cancellation zone. The second filter may be further configured to correct for the noise-cancellation audio signal received by the reference sensor. In other words, the second filter output signal is configured to cancel a portion of the first filter output signal based on the noise-cancellation audio signal received at the reference sensor, when the first filter output signal and the second filter output signal are combined.

At step 210, the noise-cancellation filter, based on the filter output signal, is adjusted such that the noise-cancellation audio signal destructively interferes with the undesired sound at the third location and the estimated or predicted error signal is minimized. For example, the first filter output signal and the second filter output signal may be fed to an adaptive algorithm, which updates the adaptive filter, such that it generates a noise-cancellation signal based on an the estimated or predicted residual sound in the cancellation zone rather than at the location of reference sensor.

Figure 4:
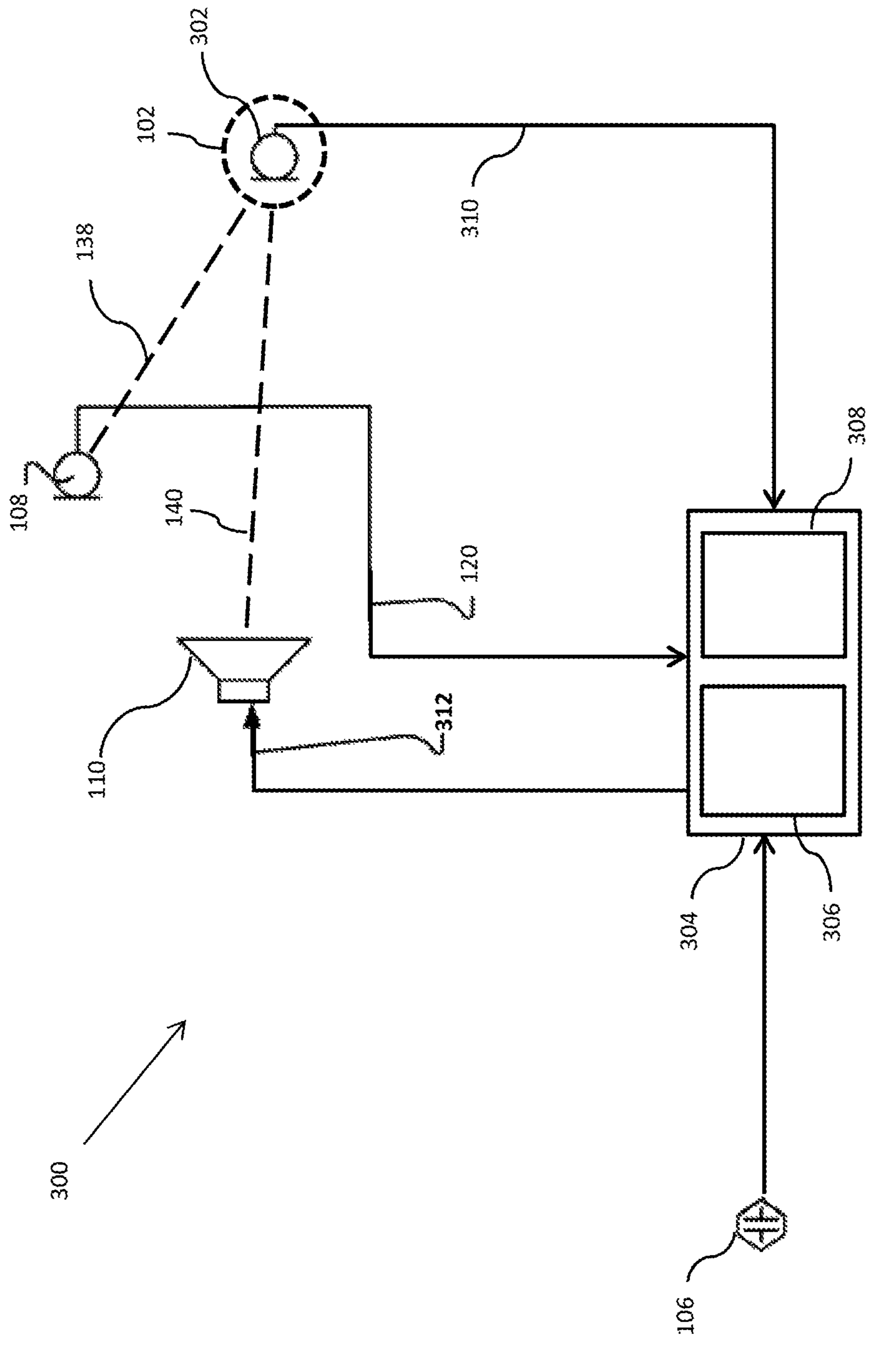
FIG. 4 is a schematic of a tuning system according to an embodiment.

FIG. 4 depicts a tuning system 300 for tuning Wcmd filter 128 and Wref filter 130, according to an embodiment. As shown, tuning system 300, like noise-cancellation system 100, includes reference sensor 108 and actuator 110. In addition, tuning system 300 includes error sensor 302. Error sensor 302 may be, for example, a microphone, although other sensors suitable for detecting the audio signal at a location may be used. Error sensor is positioned in the desired location of the cancellation zone (e.g, at a passenger's ears). Tuning system 300 further includes tuning controller 304. Tuning controller 304 may include, for example, a non-transitory storage medium suitable 306 for storing program that, when executed by a processor 308, performs the steps shown in FIGS. 5-6. Controller 304 may be controller 112 or may be implemented as a separate controller. In various embodiments, controller 304 may be implemented by a general process computer, an FPGA, an ASIC, or any other controller suitable for executing the steps described in connection with FIGS. 5-6.

Further, tuning controller 304 may generate a command signal 312 to be transduced into an audio signal at actuator 110 and tuning controller may receive a reference sensor signal 120 from reference sensor 108 and an error sensor signal 310 from error sensor 302.

Figure 5:
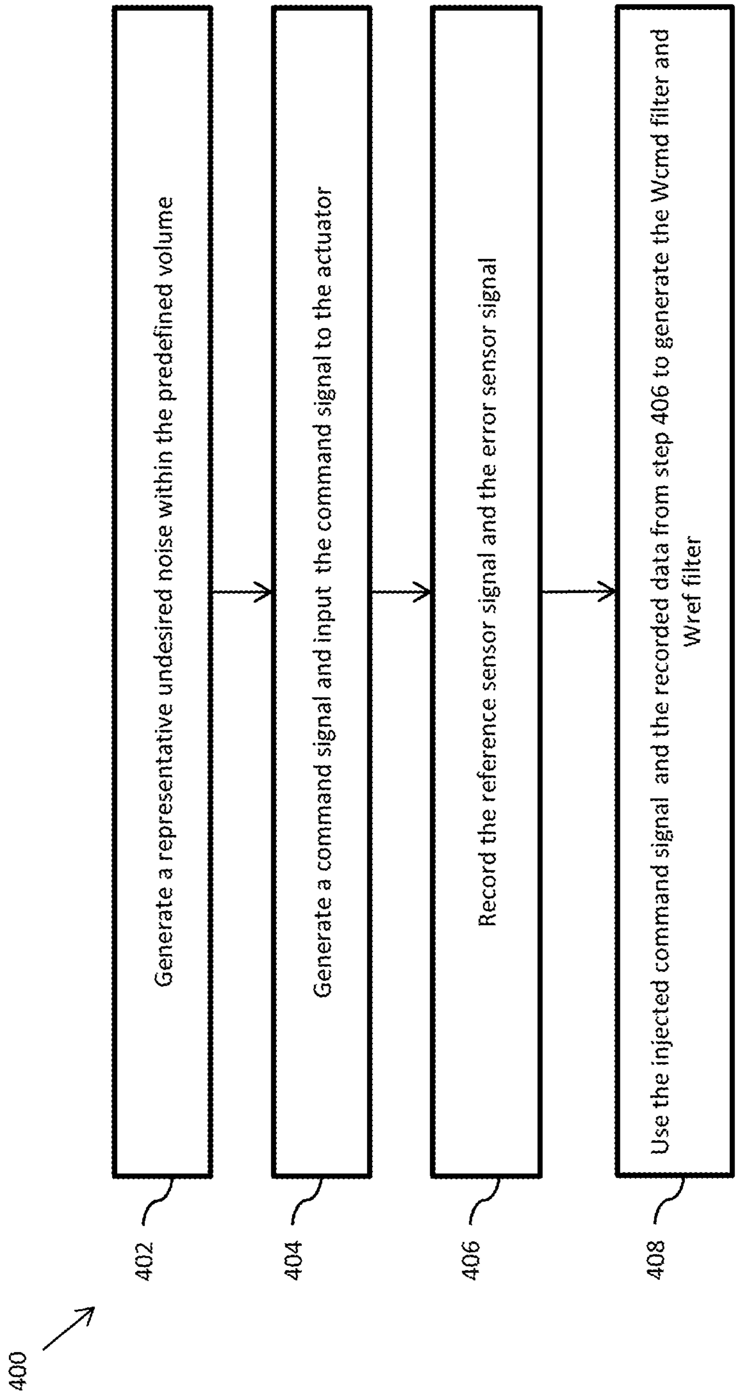
FIG. 5 is a flowchart of a tuning method according to an embodiment.
Figure 6:
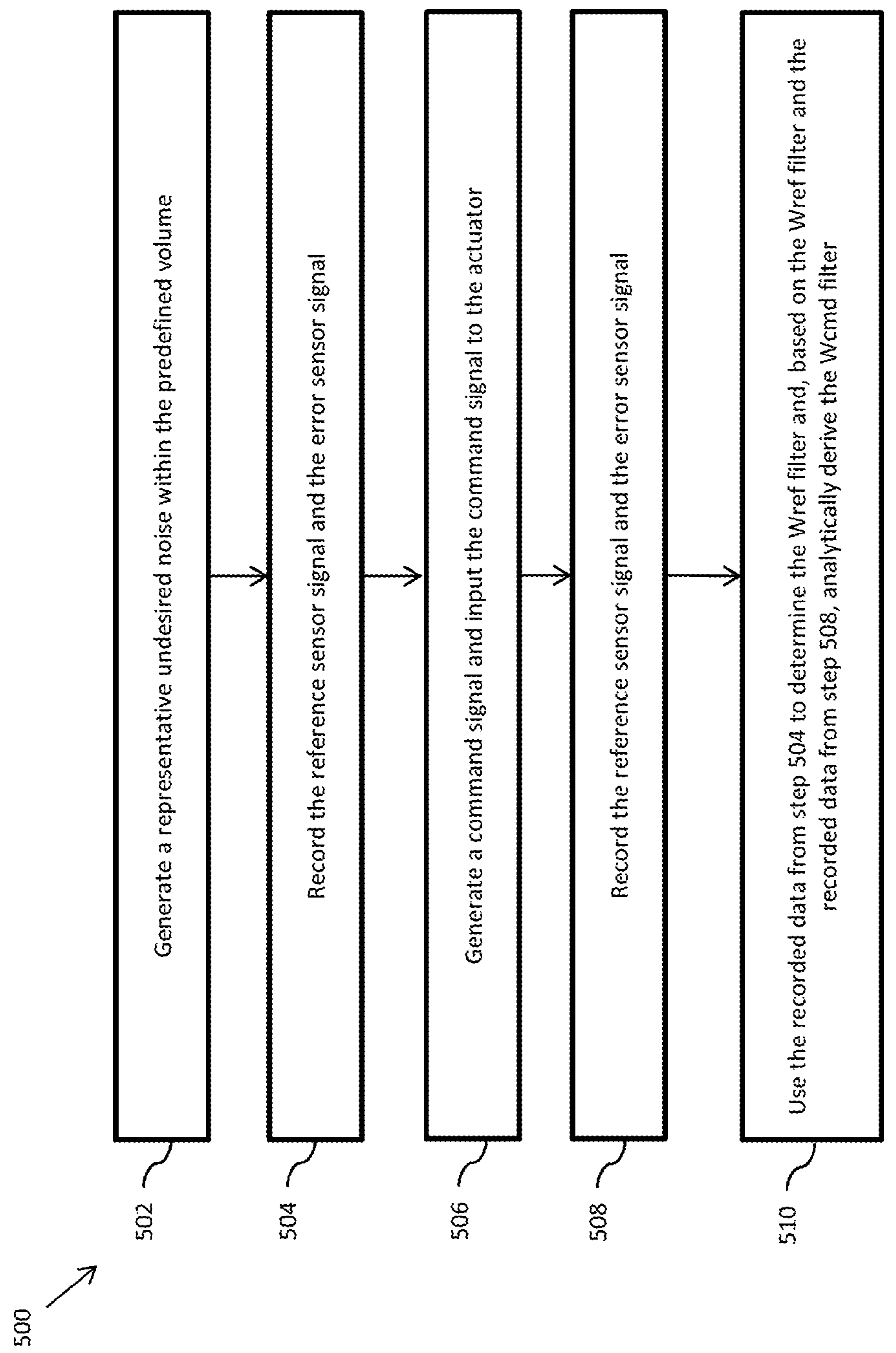
FIG. 6 is a flowchart of a tuning method according to an embodiment.

FIGS. 5 and 6 generally show alternate approaches for collecting data and generating filters Wcmd filter 128 and Wref filter 130 and in order to minimize the cost function of equation (9) stated above.

Turning first to FIG. 5, there is shown a first method 400 for collecting data and generating filters Wcmd filter 128 and Wref filter 130.

At step 402, a representative undesired noise may be generated within the predefined volume 104. This may be accomplished, in the vehicle embodiment, by driving the vehicle down a road.

At step 404, which occurs concurrently with step 402, a command signal 312 may be injected into actuator 110. In an embodiment, the command signal 312 is a computer generated random signal that is statistically independent of the road noise signal. This random signal may be spectrally shaped so that its energy is at a comparable level to the road noise on a frequency-by-frequency basis. As will be described below, a noise-shaping filter (that is road and speed dependent) may be implemented by processor 308 and applied to the command signal 312. The noise-shaping filter may be configured to drive the actuator 110 at a level that does not overdrive the representative undesired noise.

At step 406, which occurs concurrently with step 402 and 404, the audio signal resulting from the representative undesired noise and the output audio signal from actuator 110 will be detected by reference sensor 108 and error sensor 302. The resulting output signals from each, reference sensor signal 120 and error sensor signal 310, may be recorded, e.g., in non-transitory storage medium 306.

At step 408, the injected command signal 312, and the recorded reference sensor signal 120 and error sensor signal 310 may be used to generate filters Wcmd filter 128 and Wref filter 130 in order to minimize the cost function of equation (9) stated above. Generating Wcmd filter 128 and Wref filter 130 may be accomplished by standard solution techniques as are known in the art.

Method 400, however, as described, requires an iterative approach as the noise-shaping filter implemented by processor 308 is road and speed dependent. Accordingly, FIG. 6 shows, in an alternate embodiment, method 500, which may be accomplished by injecting a command signal 312 to actuator 110 non-concurrently as opposed to concurrently as described in steps 402, 404, and 406. Separating the road noise data collection and the command signal data collection avoids the iterative process of method 400.

At step 502, a representative undesired noise may be generated within the predefined volume 104. This may be accomplished, in the vehicle embodiment, by driving the vehicle down a road.

At step 504, which occurs concurrently with step 502, the representative undesired noise will be detected by reference sensor 108 and error sensor 302, and the resulting output signals from each, reference sensor signal 120 and error sensor signal 310, may be recorded, e.g., in non-transitory storage medium 306.

At step 506, which occurs non-concurrently with steps 502 and 504, command signal 312 may be generated and injected to actuator 110. (Command signal 312 may be any command signal suitable for generating $T_{de}$ [n] and $T_{dr}$[n], as described below.) Furthermore, step 506 preferably occurs with any other undesired noises minimized. For example, in the vehicle embodiment, step 506 may be performed in a quiet space (such as a quiet garage), without the vehicle engine running.

At step 508, which occurs concurrently with step 506, the audio signal generated by actuator 110, in response to the input command signal, will be detected by reference sensor 108 and error sensor 302. The resulting output signals from each, reference sensor signal 120 and error sensor signal 310, may be recorded, e.g., in non-transitory storage medium 306.

At step 510, Wref filter 130 may be generated using the recorded data of step 504 and Wcmd filter 128 may be determined analytically. More specifically, the recorded reference sensor signal 120 and error sensor signal 310 may be used to derive Wref filter 130, and thus $W_{ref}$[n] of equation (2). The remaining terms of equation (2), $T_{de}$ [n] and $T_{dr}$ [n], may be obtained using the recorded data of step 506 by any standard system identification technique. Once these three terms of equation (2) are known, Wcmd filter 128 may be determined analytically. Method 500 may thus be performed without requiring a filtered command signal 312 to be played concurrently during the road noise data collection step 502, thus avoiding the necessity to iteratively balance signal 312 with the road noise levels in the cabin which are both speed and road surface dependent.

It should be understood that methods 400 and 500 may be repeated or otherwise performed for any number of speakers, error sensors, or reference sensors.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A noise-cancellation system, comprising:

a noise-cancellation filter configured to generate a noise-cancellation signal based on a noise signal received from a noise sensor;

an actuator disposed at a first location within a predefined volume and configured to receive the noise-cancellation signal and to transduce a noise-cancellation audio signal within the predefined volume;

a reference sensor disposed at a second location within the predefined volume and to output a reference sensor signal, the reference sensor signal being representative of an undesired noise at the second location;

a filter configured to filter the noise-cancellation signal and the reference sensor signal to output a filter output signal, the filter output signal representing an estimate of the undesired nose at a third location remote from the first location and the second location; and an adjustment module configured to adjust the noise-cancellation filter, based on the filter output signal, such that the noise-cancellation audio signal destructively interferes with the undesired noise at the third location.

2. The noise-cancellation system of claim 1, wherein the filter output signal is based on an estimate of a relationship between the first location and the third location and based on an estimate of a relationship between the second location and the third location.

3. The noise-cancellation system of claim 1, wherein the filter comprises a first filter configured to estimate a relationship between the second location and the third location, the first filter being configured to receive and filter the reference sensor signal and to output a first filter output signal, the first filter output signal being an estimate of the undesired noise at the third location.

4. The noise-cancellation system of claim 3, wherein the filter further comprises a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

5. The noise-cancellation system of claim 1, wherein the filter comprises at least one predictive filter such that the estimate the undesired noise at the third location is an estimate of the undesired noise at the third location at a future point in time.

6. The noise-cancellation system of claim 5, wherein the at least one predictive filter is a Wiener filter.

7. Program code stored on a non-transitory storage medium that, when executed by a processor, comprises the steps of:

generating, with a noise-cancellation filter, a noise-cancellation signal based on a noise signal received from a noise sensor;

providing the noise-cancellation signal to an actuator disposed at a first location for transduction of a noise-cancellation audio signal within a predefined volume;

receiving a reference sensor signal from a reference sensor disposed at a second location within the predefined volume, the reference sensor signal being representative of an undesired noise at the second location;

filtering, with a filter, the noise-cancellation signal and the reference sensor signal to output a filter output signal, the filter output signal representing an estimate of the undesired noise at a third location remote from the first location and the second location; and adjusting the noise-cancellation filter, based on the filter output, such that the noise-cancellation audio signal destructively interferes with the undesired noise at the third location.

8. The program code of claim 7, wherein the filter output signal is based on an estimate of a relationship between the first location and the third location and based on an estimate of a relationship between the second location and the third location.

9. The program code of claim 7, wherein the filter comprises a first filter configured to estimate a relationship between the second location and the third location, the first filter being configured to receive and filter the reference sensor signal and to output a first filter output signal, the first filter output signal being an estimate of the undesired noise at the third location.

10. The program code of claim 9, wherein the filter further comprises a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

11. The program code of claim 7, wherein the filter comprises at least one predictive filter such that the estimate the undesired noise at the third location is an estimate of the undesired noise at the third location at a future point in time.

12. The program code of claim 7, wherein the at least one predictive filter is a Wiener filter.

13. A noise-cancellation method, comprising the steps of:

generating, with a noise-cancellation filter, a noise-cancellation signal based on a noise signal received from a noise sensor;

providing the noise-cancellation signal to an actuator disposed at a first location for transduction of a noise-cancellation audio signal within a predefined volume;

receiving a reference sensor signal from a reference sensor disposed at a second location within the predefined volume, the reference sensor signal being representative of an undesired noise at the second location;

filtering, with a filter, the noise-cancellation signal and the reference sensor signal to output a filter output signal, the filter output signal representing an estimate of the undesired noise at a third location remote from the first location and the second location; and adjusting the noise-cancellation filter, based on the filter output, such that the noise-cancellation audio signal destructively interferes with the undesired noise at the third location.

14. The method of claim 13, wherein the filter output signal is based on an estimate of a relationship between the first location and the third location and based on an estimate of a relationship between the second location and the third location.

15. The method of claim 13, wherein the filter comprises a first filter configured to estimate a relationship between the second location and the third location, the first filter being configured to receive and filter the reference sensor signal and to output a first filter output signal, the first filter output signal being an estimate of the undesired noise at the third location.

16. The method of claim 15, wherein the filter further comprises a second filter configured to estimate a relationship between the first location and the third location, the second filter being configured to receive and filter the noise-cancellation signal and to output a second filter output signal, the second filter output signal being an estimate of the noise-cancellation audio signal at the third location, wherein the second filter output signal is configured to cancel a portion of the first filter output signal based on the noise-cancellation audio signal received at the reference sensor, when the first filter output signal and the second filter output signal are summed.

17. The method of claim 13, wherein the filter comprises at least one predictive filter such that the estimate the undesired noise at the third location is an estimate of the undesired noise at the third location at a future point in time.

18. The method of claim 17, wherein the at least one predictive filter is a Wiener filter.

19. The method of claim 11, further comprising the step of: during a configuration, using an error signal from an error sensor positioned at the third location to tune the filter.

20. The method of claim 19, wherein the error signal is generated in response to an audio signal generated at the actuator.

* * * * *